(12) United States Patent
Zhu et al.

(10) Patent No.: US 10,425,943 B2
(45) Date of Patent: Sep. 24, 2019

(54) APPARATUS AND METHOD IN WIRELESS COMMUNICATIONS SYSTEM

(71) Applicant: Sony Corporation, Tokyo (JP)

(72) Inventors: Wenxiang Zhu, Jiangsu (CN); Pingping Xu, Jiangsu (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/744,331

(22) PCT Filed: Jul. 22, 2016

(86) PCT No.: PCT/CN2016/090997
§ 371 (c)(1),
(2) Date: Jan. 12, 2018

(87) PCT Pub. No.: WO2017/012583
PCT Pub. Date: Jan. 26, 2017

(65) Prior Publication Data
US 2018/0206235 A1  Jul. 19, 2018

(30) Foreign Application Priority Data
Jul. 23, 2015 (CN) .......................... 2015 1 0437836

(51) Int. Cl.
*H04B 7/00* (2006.01)
*H04W 72/04* (2009.01)
(Continued)

(52) U.S. Cl.
CPC ....... *H04W 72/0453* (2013.01); *H04W 28/08* (2013.01); *H04W 48/20* (2013.01);
(Continued)

(58) Field of Classification Search
None
See application file for complete search history.

(56) References Cited

U.S. PATENT DOCUMENTS

| 2012/0129522 | A1 | 5/2012 | Kim et al. | |
|---|---|---|---|---|
| 2013/0155991 | A1 | 6/2013 | Kazmi et al. | |
| 2013/0225179 | A1 | 8/2013 | Jul et al. | |
| 2014/0378157 | A1* | 12/2014 | Wei ........ | H04W 16/14 455/454 |
| 2016/0007350 | A1* | 1/2016 | Xiong ........ | H04W 24/10 370/252 |
| 2016/0066195 | A1* | 3/2016 | Moon ........ | H04W 16/14 455/454 |

(Continued)

FOREIGN PATENT DOCUMENTS

| CN | 103168491 A | 6/2013 |
|---|---|---|
| CN | 103210677 A | 7/2013 |
| CN | 103338454 A | 10/2013 |

*Primary Examiner* — Kwang B Yao
*Assistant Examiner* — Juvena W Loo
(74) *Attorney, Agent, or Firm* — Xsensus LLP

(57) ABSTRACT

An apparatus and a method in a wireless communications system including a first base station and a second base station sharing a licensed band, and the second base station operable on an unlicensed band. The apparatus includes: a receiving unit, configured to receive information indicating received signal strength from user equipments served by the first and second base stations; a decision-making unit, configured to issue a switching instruction according to the received information, to optimize energy efficiency and frequency spectrum efficiency in the wireless communications system, the switching instruction including information indicating user equipments in the user equipments are to be switched to operate on an unlicensed band; and a notification unit, configured to notify the switching instruction to the second base station.

20 Claims, 12 Drawing Sheets

(51) Int. Cl.
  *H04W 52/02* (2009.01)
  *H04W 28/08* (2009.01)
  *H04W 48/20* (2009.01)
  *H04W 16/14* (2009.01)
  *H04W 84/04* (2009.01)
  *H04W 88/10* (2009.01)

(52) U.S. Cl.
  CPC ..... *H04W 52/0206* (2013.01); *H04W 72/042* (2013.01); *H04W 16/14* (2013.01); *H04W 84/045* (2013.01); *H04W 88/10* (2013.01); *Y02D 70/00* (2018.01); *Y02D 70/1262* (2018.01); *Y02D 70/1264* (2018.01); *Y02D 70/142* (2018.01); *Y02D 70/166* (2018.01)

(56) References Cited

U.S. PATENT DOCUMENTS

| | | | |
|---|---|---|---|
| 2016/0119846 A1* | 4/2016 | Chou | H04W 36/22 370/331 |
| 2017/0142737 A1* | 5/2017 | Zheng | H04W 16/14 |
| 2017/0202007 A1* | 7/2017 | Miao | H04W 72/04 |
| 2017/0230975 A1* | 8/2017 | Tanaka | H04W 72/0406 |
| 2017/0265172 A1* | 9/2017 | Futaki | H04W 16/14 |
| 2017/0311327 A1* | 10/2017 | Tanaka | H04W 74/02 |
| 2018/0007688 A1* | 1/2018 | Fu | H04L 5/0048 |
| 2018/0007710 A1* | 1/2018 | Tanaka | H04W 72/042 |
| 2018/0020437 A1* | 1/2018 | Cui | H04W 24/02 |
| 2018/0175975 A1* | 6/2018 | Um | H04L 1/1816 |

* cited by examiner

APPARATUS AND METHOD IN WIRELESS COMMUNICATIONS SYSTEM

TECHNICAL FIELD

The present disclosure relates to the field of wireless communication technology, and in particular to a device and a method in a wireless communication system for optimizing energy efficiency and frequency spectrum efficiency in a heterogeneous network jointly using a licensed band and an unlicensed band.

BACKGROUND

With the rapid development of the communications, users have higher requirements for data capacity, which brings higher technical challenges to the communication industry. Confronted with the high requirements, in the next generation wireless network (the fifth generation mobile communication network, 5G), operators consider increasing the data rate for users in the network to a new level, for example, the data capacity of the mobile users per unit area is a thousand times greater than that in 4G network (the fourth generation mobile communication network). A new network architecture called heterogeneous network is proposed in the industry as a key technology that can meet requirements of the operators. In the architecture of heterogeneous network, low-power small base stations (e.g., base stations, relays, and the like of a microcell, a picocell and a femtocell) are deployed and share the same spectral resources with high-power macro base stations (a base station of a macrocell) to achieve the purpose of increasing a spectral efficiency and a data capacity per unit area in the network.

A recent report on energy consumption in a cellular network indicates that up to 82.5% of network energy is consumed on the base station side. That is, in a case that a large number of small base stations are deployed to meet the demand for data capacity of the users, the total energy consumption of the network is multiplied with the increase in the number of base stations in the network. Hence, the energy efficiency problem of the network becomes a research focus of the next generation network. To this end, in the scenario of the heterogeneous network, to improve the energy efficiency of the network, research on the green communication (GR) technology is very important. At present, there are two major international cooperation projects in research on the green communication: the green communication project of the mobile virtual centre of excellence (MVCE) and energy aware radio and network technologies (EARTH). These two cooperative research organizations have invested a lot of manpower and material resources in research on the GR technology.

At present, the research on energy efficiency and spectral efficiency is mainly focused on allocation of resources in the licensed band, while quite a little research is made on the joint use of the unlicensed band and the licensed band. Since additional resources are available on the unlicensed band, licensed assisted access (LAA) technology is proposed so that the cell can operate on both the licensed band and the unlicensed band to achieve the purpose of improving the network capacity by increasing the bandwidth. By jointly using the licensed and unlicensed bands, it is possible to narrow the gap between the limited capacity of the licensed band and the fast-growing rate demand of the users. At present, there are, for example, the following schemes for the joint use of the licensed and unlicensed bands: 1) a scheme in which, for example, a femtocell can access to both a licensed band and an unlicensed band, which mainly takes the usage of the unlicensed band and the coexistence of femtocells and Wi-Fi into consideration; 2) a scheme in which the transmission of small cells on the licensed and unlicensed bands is controlled, which can maximize network throughput while meeting the requirements of quality of service (QoS), but only improves the performance of the network throughput by using interference coordination, without considering the energy efficiency and the spectral efficiency; and 3) a scheme in which energy and spectrum efficiencies are jointly used to optimize an outage capacity, which however only considers resource allocation on the licensed band.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above, an object of the present disclosure is to provide an apparatus and a method in a wireless communication system that jointly optimize resource allocation on both a licensed band and an unlicensed band to achieve optimized energy efficiency and spectral efficiency, rather than jointly optimizing the energy efficiency and spectral efficiency on only the licensed band or optimizing only the throughput on the unlicensed and licensed bands as in the conventional technology.

According to an aspect of the present disclosure, it is provided an apparatus in a wireless communication system, where the wireless communication system comprises a first base station and a second base station, the first base station and the second base station share a licensed band and the second base station is also able to operate on an unlicensed band, the apparatus including: a receiving unit configured to receive information indicating a reception signal strength from a user equipment served by the second base station and information indicating a reception signal strength from a user equipment served by the first base station; a deciding unit configured to make a switching instruction based on the received information to optimize energy efficiency and frequency spectrum efficiency in the wireless communication system, where the switching instruction comprises an instruction that which of the user equipment is to switch to operate on the unlicensed band; and a notifying unit configured to notify the second base station of the switching instruction.

According to a preferred embodiment of the present disclosure, the deciding unit is further configured to determine energy efficiency per unit bandwidth in the wireless communication system based on the received information, and make the switching instruction based on the energy efficiency per unit bandwidth to optimize the energy efficiency per unit bandwidth.

According to a preferred embodiment of the present disclosure, the deciding unit is further configured to make the switching instruction in a manner that the energy efficiency per unit bandwidth is maximized while satisfying predetermined performance requirements of all the user equipment.

According to a preferred embodiment of the present disclosure, the deciding unit is further configured to make the switching instruction by taking a signal-to-interference-plus-noise ratio threshold as an optimization variable to maximize the energy efficiency per unit bandwidth, wherein a signal-to-interference-plus-noise ratio of the user equipment being to switch to operate on the unlicensed band is smaller than the signal-to-interference-plus-noise ratio threshold.

According to a preferred embodiment of the present disclosure, the receiving unit is further configured to receive an idle indication of whether the unlicensed band is idle from the second base station.

According to a preferred embodiment of the present disclosure, the deciding unit is further configured to make the switching instruction upon reception of the idle indication that the unlicensed band is idle.

According to a preferred embodiment of the present disclosure, the notifying unit is further configured to notify the second base station of the switching instruction upon reception of the idle indication that the unlicensed band is idle.

According to a preferred embodiment of the present disclosure, the information indicating the reception signal strength includes at least one of reference signal receiving quality and reference signal receiving power.

According to a preferred embodiment of the present disclosure, the switching instruction further includes operating time during which the user equipment being to switch to operate on the unlicensed band operates on the unlicensed band.

According to a preferred embodiment of the present disclosure, the first base station is a macro base station, and the second base station is a small base station.

According to another aspect of the present disclosure, it is further provided an apparatus in a wireless communication system, wherein the wireless communication system comprises a first base station and a second base station, the first base station and the second base station share a licensed band and the second base station is also able to operate on an unlicensed band, the apparatus including: a first receiving unit configured to receive information indicating a reception signal strength from a user equipment served by the second base station; a detecting unit configured to detect whether the unlicensed band is idle; and a first sending unit configured to send, in a case that the detecting unit detects the unlicensed band is idle, an switching instruction made based on the received information to a corresponding user equipment among the user equipment to optimize energy efficiency and frequency spectrum efficiency in the wireless communication system, where the switching instruction comprises an instruction that which of the user equipment is to switch to operate on the unlicensed band.

According to another aspect of the present disclosure, it is further provided an apparatus in a wireless communication system, wherein the wireless communication system comprises a first base station and a second base station, the first base station and the second base station share a licensed band and the second base station is also able to operate on an unlicensed band, the apparatus including: a sending unit configured to send to the second base station information indicating a reception signal strength measured by a user equipment served by the second base station; and a receiving unit configured to receive a switching instruction from the second base station, where the switching instruction comprises an instruction that which of the user equipment is to switch to operate on the unlicensed band when the unlicensed band is idle, to optimize energy efficiency and frequency spectrum efficiency in the wireless communication system.

According to another aspect of the present disclosure, it is further provided a method in a wireless communication system, wherein the wireless communication system comprises a first base station and a second base station, the first base station and the second base station share a licensed band and the second base station is also able to operate on an unlicensed band, the method including: a receiving step of receiving information indicating a reception signal strength from a user equipment served by the second base station and information indicating a reception signal strength from a user equipment served by the first base station; a deciding step of making a switching instruction based on the received information to optimize energy efficiency and frequency spectrum efficiency in the wireless communication system, where the switching instruction comprises an instruction that which of the user equipment is to switch to operate on the unlicensed band; and a notifying step of notifying the second base station of the switching instruction.

According to another aspect of the present disclosure, it is further provided a method in a wireless communication system, wherein the wireless communication system comprises a first base station and a second base station, the first base station and the second base station share a licensed band and the second base station is also able to operate on an unlicensed band, the method including: a first receiving step of receiving information indicating a reception signal strength from a user equipment served by the second base station; a detecting step of detecting whether the unlicensed band is idle; and a first sending step of sending, in a case that it is detected the unlicensed band is idle, a switching instruction made based on the received information to a corresponding user equipment among the user equipment to optimize energy efficiency and a frequency spectrum efficiency in the wireless communication system, where the switching instruction comprises an instruction that which of the user equipment is to switch to operate on the unlicensed band.

According to another aspect of the present disclosure, it is further provided a method in a wireless communication system, wherein the wireless communication system comprises a first base station and a second base station, the first base station and the second base station share a licensed band and the second base station is also able to operate on an unlicensed band, the method including: a sending step of sending to the second base station information indicating a reception signal strength measured by a user equipment served by the second base station; and a receiving step of receiving a switching instruction from the second base station, where the switching instruction comprises an instruction that which of the user equipment is to switch to operate on the unlicensed band when the unlicensed band is idle, to optimize energy efficiency and frequency spectrum efficiency in the wireless communication system.

According to another aspect of the present disclosure, an electronic device is further provided. The electronic device may include one or more processors which may be configured to perform the above-described methods in the wireless communication system according to the present disclosure.

According to other aspects of the present disclosure, computer program codes and a computer program product for implementing the methods of the present disclosure, and a computer readable storage medium, on which the computer program codes for implementing the methods of the present disclosure are recorded, are further provided.

According to the embodiments of the present disclosure, by jointly optimizing the energy efficiency and spectral efficiency on the licensed band and the unlicensed band, the network energy efficiency can be ensured without significantly increasing the bandwidth, and the interference between the user equipment can be reduced, thereby improving the system performance.

Other aspects of embodiments of the present disclosure are given in the following parts of the description. In which, detailed illustration is used to sufficiently disclose preferred embodiments of the embodiments of the present disclosure rather than to limit the present disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1:
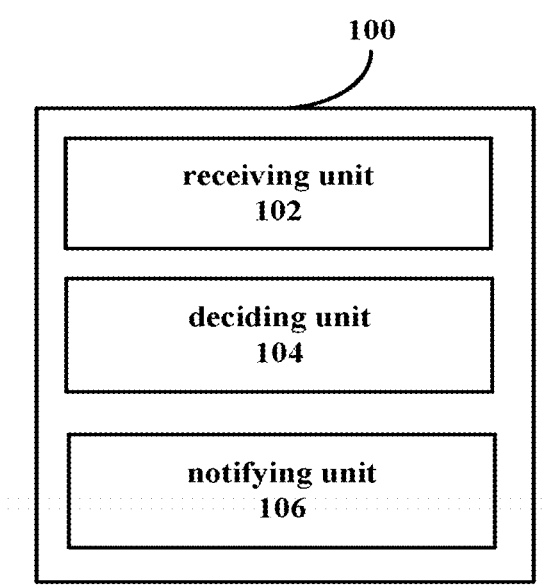
FIG. 1 is a block diagram illustrating an example of a functional configuration of an apparatus in a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Hereinafter, embodiments of the present disclosure will be described in detail with reference to FIGS. 1 to 16.

Firstly, an example of a functional configuration of an apparatus in a wireless communication system according to an embodiment of the present disclosure will be described with reference to FIG. 1. FIG. 1 is a block diagram illustrating an example of a functional configuration of an apparatus in a wireless communication system according to an embodiment of the present disclosure.

As shown in FIG. 1, an apparatus 100 according to the present embodiment may include a receiving unit 102, a deciding unit 104 and a notifying unit 106. An example of a functional configuration of each unit will be described in detail below.

The receiving unit 102 may be configured to receive information indicating a reception signal strength from a user equipment served by a second base station and information indicating a reception signal strength from a user equipment served by a first base station.

The first base station and the second base station both are included in the wireless communication system and share a licensed band, and the second base station can also support operating on an unlicensed band. Preferably, the first base station may be a macro base station, and the second base station may be a small base station (for example, a micro base station, a femto base station, an eNB and the like).

Figure 2:
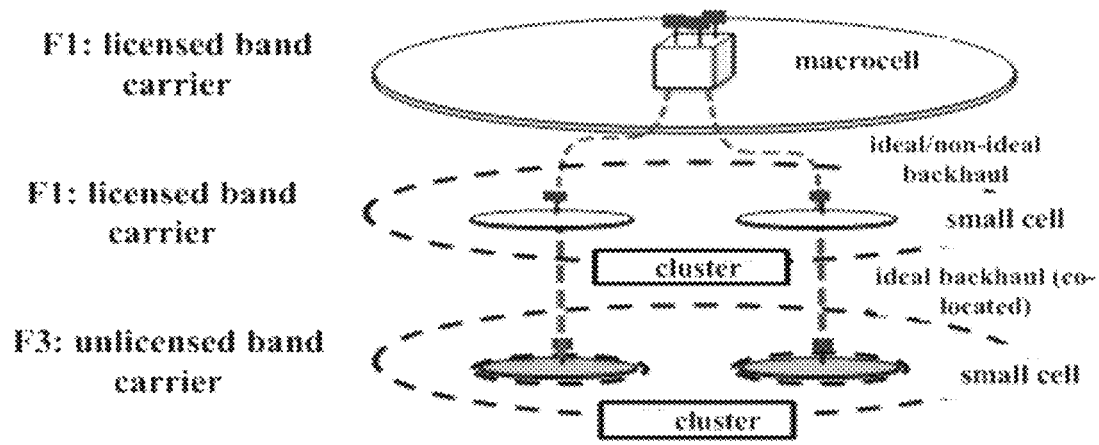
FIG. 2 is a schematic diagram illustrating an example of a network deployment scenario according to an embodiment of the present disclosure.

FIG. 2 illustrates a schematic diagram of an example of a network deployment scenario according to an embodiment of the present disclosure. It should be noted that, in the example shown in FIG. 2, the deployment scenario of the heterogeneous network is described with an example of a two-layer heterogeneous network in which the macrocell and the small cell share the licensed band. However, it should be understood that the present disclosure can also be applicable to other heterogeneous network deployment scenarios (e.g., a heterogeneous network where a macrocell and a femtocell coexist, a heterogeneous network where a small cell and a wireless local area network (Wi-Fi) coexist, or a heterogeneous networks having three or more layers, etc.). As shown in FIG. 2, the macrocell and the small cell share the licensed band, and when the unlicensed band is idle, the small cell can also operate on the unlicensed band.

Figure 3:
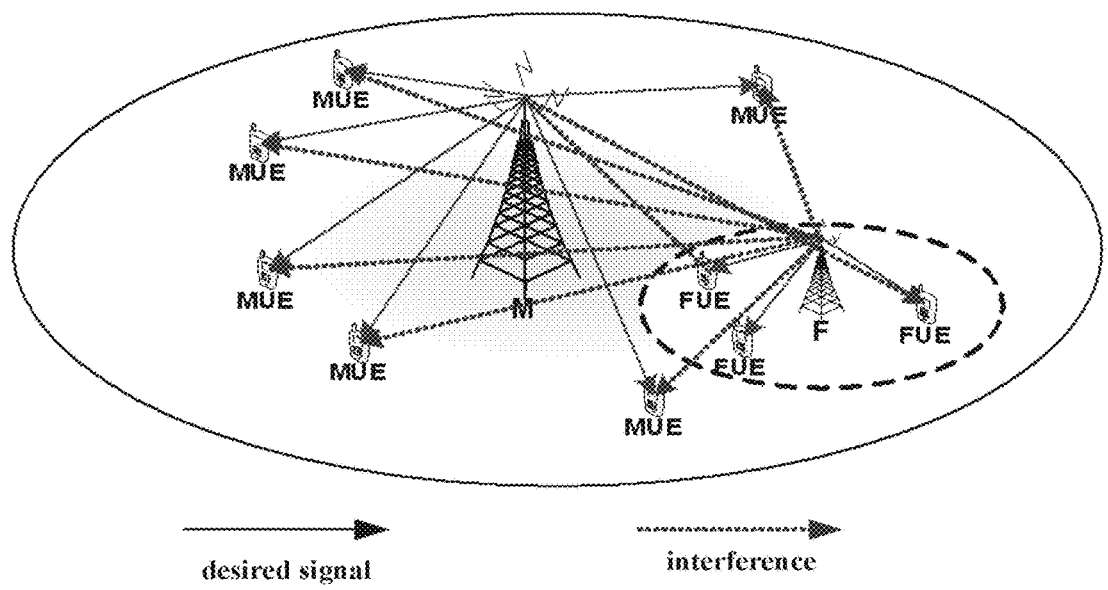
FIG. 3 is a schematic diagram illustrating a model example of a wireless communication system according to an embodiment of the present disclosure.

FIG. 3 is a schematic diagram illustrating a model example of a wireless communication system according to an embodiment of the present disclosure. As shown in FIG. 3, M indicates a macro base station, F indicates a femto base station, MUE indicates a user equipment served by the macro base station, and FUE indicates a user equipment served by the femto base station. Here, it is assumed that both the femto base station and the user equipment served by the femto base station (hereinafter abbreviated as "FUE") have two types of air interfaces so that both the femto base station and the FUE can operate on the unlicensed band.

It should be understood that although only one macro base station and one femto base station are shown as an example in FIG. 3, the number of the macro base stations and the number of the femto base stations are not limited thereto, and there may be two or more macro base stations and femto base stations in an actual network.

Preferably, the receiving unit 102 may further receive an indication of whether the unlicensed band is idle from the second base station (here, for example, the femto base station). In particular, the femto base station may detect the unlicensed band and notify the first base station (here, for example, the macro base station) when the unlicensed band is detected as idle, so that the macro base station may, for example, start to make a decision to switch some FUEs to operate on the unlicensed band upon reception of the idle indication, or may make a decision in advance and directly instruct which FUEs need to switch to operate on the unlicensed band upon reception of the idle indication. These two cases will be described later in detail.

In addition, preferably, the information indicating the reception signal strength may be, for example, at least one of a reference signal receiving quality (RSRQ) and a reference signal receiving power (RSRP).

The deciding unit 104 may be configured to make a switching instruction based on the received information so as to optimize energy efficiency and frequency spectrum efficiency in the wireless communication system. The switching instruction may include an instruction that which of the user equipment is to switch to operate on the unlicensed band. Further, preferably, the switching instruction may further include operating time during which the user equipment being to switch to the unlicensed band operates on the unlicensed band, and the operating time may be determined, for example, according to relevant standards to prevent the FUE from always occupying the unlicensed band and affecting performance of other licensed users.

The notifying unit 106 may be configured to notify the second base station of the switching instruction, so that the second base station instructs related user equipment to switch to operate on the unlicensed band and notifies the user equipment of the operating time on the unlicensed band.

As described above, the deciding unit 104 may make the switching instruction when the receiving unit 102 receives the idle indication that the unlicensed band is idle. In this way, the relevant calculations and decisions are made only when the unlicensed band is idle, which can reduce the processing load, but may result in some delay in switching.

Alternatively, the deciding unit 104 may, for example, make relevant decisions at a predetermined cycle regardless of whether the unlicensed band is idle and instruct which user equipment needs to switch to operate on an unlicensed band immediately after the receiving unit 102 receives the idle indication. That is, the notifying unit 106 may notify the second base station of the switching instruction immediately upon reception of the idle indication that the unlicensed band is idle. In this way, the delay between the time when the unlicensed band is detected as idle and the time when relevant user equipment switches to operate on the unlicensed band may be reduced, thereby improving the processing efficiency. However, since the deciding unit 104 needs to make calculations and decisions relatively frequently, the processing load and power consumption may be increased.

In an actual implementation, an appropriate way may be selected from the above two ways based on the actual network conditions and performance requirements to achieve better performance.

Preferably, by way of example, in order to comprehensively consider spectral efficiency and energy efficiency, the deciding unit 104 may be further configured to determine energy efficiency per unit bandwidth in the wireless communication system based on the received information and make the switching instruction based on the energy efficiency per unit bandwidth to optimize the energy efficiency per unit bandwidth. In particular, the deciding unit 104 may be further configured to make the switching instruction in such a way that the energy efficiency per unit bandwidth is maximized while satisfying the predetermined performance requirements (e.g., a minimum data rate, etc.) of all user equipment.

As a specific example, the deciding unit 104 may be further configured to make the switching instruction by taking a signal-to-interference-plus-noise ratio (SINR) threshold as an optimization variable and using a heuristic algorithm (e.g., a dichotomy algorithm) so as to maximize the energy efficiency per unit bandwidth, where the signal-to-interference-plus-noise ratio of the user equipment being to switch to operate on the unlicensed band is less than the signal-to-interference-plus-noise ratio threshold. A specific example of the algorithm is given below.

Taking the system model shown in FIG. 3 as an example, it is assumed that the bandwidths are evenly allocated to all the user equipment in the network.

A general calculation method of the data rate of the user equipment is shown in equation (1):

$$R = W_u \log_2(1+\text{SINR}) \qquad (1)$$

where $W_u$ indicates a bandwidth occupied by the user equipment, and SINR indicates the signal-to-interference-plus-noise ratio of the user equipment.

The signal-to-interference-plus-noise ratio of the user equipment may be calculated based on the information received by the receiving unit 102 (e.g., RSRP and/or RSRQ), and particularly, may be calculated, for example, in the following two ways. One way is to calculate the SINR based on the reference signal receiving power (RSRP) fed back by the user, as shown in equation (2):

$$SINR = \frac{RSRP_s}{\Sigma RSRP_i + N_0} \quad (2)$$

where RSRP may include $RSRP_s$ of the service base station of the user equipment and $RSRP_i$ of an interfering base station, and $N_0$ indicates a receiving power of the noise.

A second way for calculating the SINR of the user equipment is to calculate the SINR based on the reference signal reception quality (RSRQ) fed back by the user, as shown in equations (3) to (6):

$$SINR = \frac{RSRP \times 12 \times N}{P_i + N_0} \quad (3)$$

$$RSSI = P_i + RSRP \times 12 \times N + N_0 \quad (4)$$

$$RSRQ = \frac{N \times RSRP}{RSSI} \quad (5)$$

$$SINR = \frac{RSRP \times 12 \times N}{\frac{N \times RSRP}{RSRQ} - RSRP \times 12 \times N} = \frac{12}{\frac{1}{RSRQ} - 12} \quad (6)$$

where N indicates the number of resource blocks, RSSI indicates a received signal strength indicator (RSSI), and $P_i$ indicates a receiving power of the interfering base station. RSRP may be calculated based on a transmission power and a corresponding channel gain.

According to the above, the data rate of the user equipment served by the macro base station (hereinafter abbreviated as MUE) is calculated as shown in equation (7):

$$R_u = \begin{cases} W_M \log_2\left(1 + \frac{P_{per}^M G_{M1,u}}{\sum_{i=2}^{N} P_{per}^M G_{M1,u} + P_{per}^F G_{F,u} + N_0}\right) & \text{if } r_u \subset r_{U_{W_l}} \\ W_M \log_2\left(1 + \frac{P_{per}^M G_{M1,u}}{\sum_{i=2}^{N} P_{per}^M G_{M1,u} + N_0}\right) & \text{otherwise} \end{cases} \quad (7)$$

where $W_M$ indicates a bandwidth occupied by MUE, $P_{per}^M$ indicates a transmission power per unit bandwidth of the macro base station, $G_{M1,u}$ indicates a channel gain from a first macro base station to MUE u on the licensed band, and $P_{per}^F$ indicates a transmission power per unit bandwidth of a femto base station. $G_{F,u}$ indicates a channel gain from the femto base station to the MUE u on the licensed band. $r_u$ indicates a band resource occupied by the MUE, $r_{U_{W_l}}$ indicates band resources occupied by the FUEs in $U_{W_l}$, $U_{W_l}$ indicates a set of FUEs occupying $W_l$, W indicates a total bandwidth occupied by the macrocell and the femtocell, $W-W_l$ indicates a bandwidth occupied by the FUEs having switched to the unlicensed band, and $W_l$ indicates a bandwidth on the licensed band occupied by the remaining FUEs after some FUEs have switched to the unlicensed band.

The total throughput of the MUE is calculated as shown in equation (8), where M indicates the total number of MUEs:

$$Thp_{macro} = \sum_{M=1}^{M} R_u \quad (8)$$

The data rate when some FUEs have switched to the unlicensed band may be calculated as shown in equation (9):

$$R_a = \frac{W - W_l}{F - U_{W_l}} \log_2\left(1 + \frac{P_{per}^F H_{F,a}}{N_0}\right) \quad (9)$$

where F indicates the total number of FUEs, and $H_{F,a}$ indicates a channel gain from the femto base station to FUE a on the unlicensed band.

After some FUEs have switched to the unlicensed band, the data rate of the FUE on the licensed band may be calculated as shown in equation (10):

$$R_b = \frac{W_l}{U_{W_l}} \log_2\left(1 + \frac{P_{per}^F G_{F,b}}{\sum_{i=1}^{N} P_{per}^M G_{M1,b} + N_0}\right) \quad (10)$$

The total throughput of the FUE is calculated as shown in equation (11):

$$Thp_{femto} = \sum_{a=1}^{F-U_{W_l}} R_a + \sum_{b=1}^{U_{W_l}} R_b \quad (11)$$

The total energy efficiency $\eta_{EE}$ in the network is calculated as shown in equation (12):

$$\eta_{EE} = \frac{Thp_{macro} + Thp_{femto}}{P_M + P_F + 2P_c} \quad (12)$$

where $P_M$ is the total energy consumption of the macrocell, $P_F$ the total energy consumption of the femtocell, and $P_c$ is the energy consumption of a circuit on the base station side.

The switching scheme of the user equipment is modeled as an optimization problem. To ensure the overall effect of the network, the decision of the switching should be made by jointly considering the energy efficiency and the spectral efficiency. Hence, a utility function can be expressed as the energy efficiency per unit bandwidth, as shown in equation (13), meanwhile restrictions on user's data rate should be satisfied:

$$\max_{SINR\_threshold} \frac{\eta_{EE}}{2W - W_l} \quad (13)$$

$$\text{s.t.} \quad R \geq R_{min}$$

$$F - U_{W_l} = U(u \mid SINR < SINR\_threshold)$$

where R indicates the user's data rate, $R_{min}$ indicates a minimum data rate threshold, which may be predetermined, and $W_l$ is a function of $U_{W_l}$.

As shown in equation (13), the utility function is modeled as the energy efficiency per unit bandwidth, and the optimization variable is the signal-to-interference-plus-noise ratio threshold SINR_threshold, i.e., finding an optimum signal-to-interference-plus-noise ratio threshold SINR_threshold so that the signal-to-interference-plus-noise ratio of the FUE being to switch to operate on the unlicensed band satisfies SINR<SINR_threshold, and the energy efficiency per unit bandwidth is maximized. Meanwhile, the restriction that the data rates of all the user equipment are greater than or equal to the minimum data rate $R_{min}$ should also be satisfied.

Since the optimization problem is not a convex problem, the heuristic algorithm (for example, the dichotomy algorithm) is used to solve the problem. As an example, the following steps are given to solve SINR_threshold.

(1) First, the energy efficiency per unit bandwidth (abbreviated as $$\delta_1 = \frac{EE}{BW},$$

where EE represents the total energy efficiency in the network and BW represents the total bandwidth) when no switching occurs is calculated and is stored as temp=$\delta_1$.

(2) N SINRs fed back by all the FUEs are ranked.

(3) The SINR threshold is set as the SINR of the FUE of the ranking number of $\lceil N/2 \rceil$, and the energy efficiency $\delta_2$ per unit bandwidth after the user equipment having SINR less than the threshold switches to the unlicensed band is calculated.

(4) If $\delta_2 > \delta_1$, then temp=$\delta_2$, the SINR threshold is increased by setting the SINR threshold as the SINR of the FUE of the ranking number of $\lceil 3N/4 \rceil$, and the energy efficiency $\delta_3$ per unit bandwidth after performing corresponding switching is calculated. If $\delta_3 > \delta_2$, then temp=$\delta_3$, otherwise temp=$\delta_2$. The SINR threshold is solved in this way until calculations with respect to all the user equipment are completed.

(5) On the other hand, if $\delta_1 > \delta_2$, then temp=$\delta_1$, the SINR threshold is reduced by setting the threshold as the SINR of the FUE of the ranking number of $\lceil N/4 \rceil$, and the energy efficiency $\delta_4$ per unit bandwidth after performing corresponding switching is calculated. If $\delta_4 > \delta_1$, then temp=$\delta_4$, otherwise temp=$\delta_1$. The SINR threshold is solved in this way until calculations with respect to all the user equipment are completed.

(6) Calculation is performed in this way to finally obtain the optimum SINR threshold SINR_threshold.

Based on the optimum SINR threshold, the FUE having SINR less than the optimum SINR threshold may switch to operate on the unlicensed band, and the energy efficiency per unit bandwidth can be maximized in this case.

It is to be understood that, although it is provided an exemplary calculation method of jointly optimizing the energy efficiency and spectral efficiency in the entire network and solving the optimum SINR threshold as above, this is only an example and not limitation. Those skilled in the art may modify the above-described algorithm according to the principle of the present disclosure and the actual performance requirements. By way of example, the above-described utility function may be not modeled as maximizing the energy efficiency per unit bandwidth, but be modeled as making both the energy efficiency and the spectral efficiency satisfy predetermined thresholds. As another example, other algorithms than the above-described dichotomy algorithm may be used to solve the optimum SINR threshold.

After the deciding unit 104 determines the FUE being to switch to operate on the unlicensed band as above, the notifying unit 106 notifies the second base station such that the second base station may send switching indexes to the corresponding FUEs to instruct the FUEs to switch to operate on the unlicensed band for the corresponding operating time, Therefore, optimization of both the spectral efficiency and the energy efficiency is achieved, thereby optimizing the overall system performance. Further, since some FUEs coexisting with the MUE at the same frequency band have switched to operate on the unlicensed band, interference on MUE may be reduced and performance of MUE is thereby improved.

The apparatus 100 described above with reference to FIGS. 1 to 3 may be located on the macro base station side, and the decision of switching may be generally made by the macro base station, since the macro base station generally acquires the information of the whole network and has a better processing performance. However, it should be understood that this is only a preferred example, and the decision of switching may be also made by the small base station, which case will be described later in detail.

Figure 4:
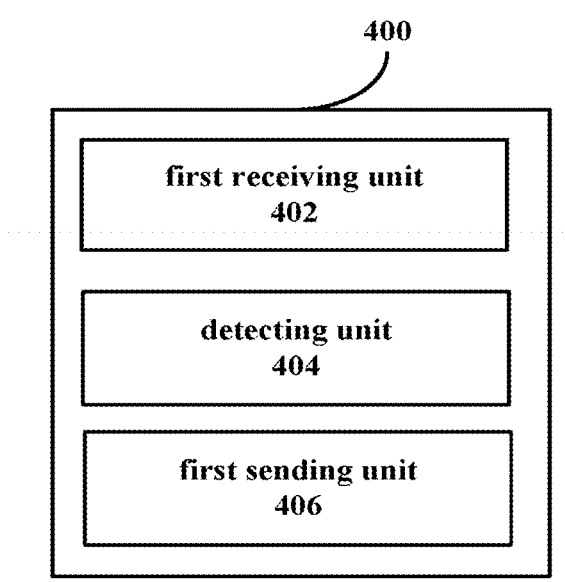
FIG. 4 is a block diagram illustrating an example of a functional configuration of an apparatus in a wireless communication system according to another embodiment of the present disclosure.

Next, an example of a functional configuration of an apparatus on the small base station side will be described with reference to FIGS. 4 to 6. FIG. 4 is a block diagram illustrating an example of a functional configuration of an apparatus in a wireless communication system according to another embodiment of the present disclosure.

As shown in FIG. 4, an apparatus 400 according to the present embodiment may include a first receiving unit 402, a detecting unit 404 and a first sending unit 406. Next an example of the functional configuration of each unit will be described in detail.

The first receiving unit 402 may be configured to receive information indicating a reception signal strength from a user equipment served by the second base station. Specifically, the user equipment accessing to the small base station (for example, FUE) may feed information indicating the reception signal strength back to the second base station for subsequent decision of switching. The information indicating the reception signal strength may include at least one of RSRP and RSRQ.

The detecting unit 404 may be configured to detect whether the unlicensed band is idle. By way of example, the detecting unit 404 may periodically detect whether the unlicensed band is idle.

The first sending unit 406 may be configured to send, when the detecting unit 404 detects that the unlicensed band is idle, the switching instruction made based on the received information to a corresponding user equipment, to optimize energy efficiency and frequency spectrum efficiency in the wireless communication system. The switching instruction may include an instruction that which of the user equipment is to switch to operate on the unlicensed band and may further include corresponding operating time.

Further, preferably, after the corresponding FUE switches to operate on the unlicensed band, if the detecting unit 404 detects that the unlicensed band is busy, the first sending unit 408 may send to the corresponding FUE an instruction to switch to operate on the licensed band. Meanwhile, the small base station may further send a busy indication to the macro base station to notify the change of its operating band.

The switching instruction is made based on the energy efficiency per unit bandwidth in the wireless communication system determined based on the received information to optimize the energy efficiency per unit bandwidth. Further, the switching instruction is made in such a way that the energy efficiency per unit bandwidth is maximized while satisfying the predetermined performance requirements of all the user equipment. In particular, the switching instruction is made by taking a SINR threshold as an optimization variable and using the heuristic algorithm to maximize the energy efficiency per unit bandwidth, in which the signal-to-interference-plus-noise ratio of the user equipment being to switch to operate on the unlicensed band is less than the SINR threshold.

The optimization algorithm for specifically making the switching decision may be referred to the foregoing description and will not be repeated here. It is to be understood that, as described above, the switching instruction may be made either on the macro base station side. Alternatively, the switching instruction may be made on the small base station side, and in this case, the macro base station needs to send information necessary for deciding the switching to the small base station. An example of the functional configuration of the apparatus on the small base station side will be described below for each of the above two cases.

Figure 5:
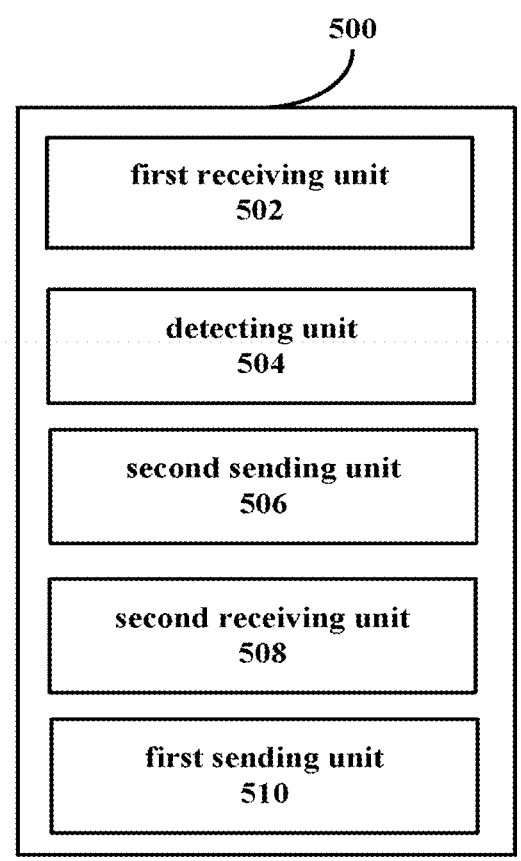
FIG. 5 is a block diagram illustrating another example of a functional configuration of an apparatus in a wireless communication system according to another embodiment of the present disclosure.

FIG. 5 is a block diagram illustrating another example of a functional configuration of an apparatus in a wireless communication system according to another embodiment of the present disclosure.

As shown in FIG. 5, an apparatus 500 in this example may include a first receiving unit 502, a detecting unit 504, a second sending unit 506, a second receiving unit 508, and a first sending unit 510. The examples of the functional configurations of the first receiving unit 502, the detecting unit 504, and the first sending unit 510 are substantially the same as those of the corresponding units described above with reference to FIG. 4, and are not repeated here. Only the examples of the functional configurations of the second sending unit 506 and the second receiving unit 508 will be described in detail below.

The second sending unit 506 may be configured to send the information received by the first receiving unit 502 to the first base station (e.g., the macro base station) for the first base station to make the switching instruction. Specifically, the second sending unit 506 may send the received RSRP and/or RSRQ fed back by the FUE to the macro base station for the macro base station to decide the switching according to the above-described optimization algorithm.

In addition, the second sending unit 506 may be further configured to send an idle indication of whether the unlicensed band is idle detected by the detecting unit 504 to the first base station, so that the first base station makes the decision of switching based on the idle instruction or notifies the second base station (e.g., the femto base station) of the decision.

The second receiving unit 508 may be configured to receive the switching instruction from the first base station, so that the first sending unit 510 sends the switching instruction to the corresponding FUE to instruct the FUE to switch to operate on the unlicensed band.

The case where the decision of switching is made on the macro base station side is described above. Alternatively, the decision of switching may be made on the small base station side. An example in this case will be described below with reference to FIG. 6, which is a block diagram illustrating yet another example of a functional configuration of an apparatus in a wireless communication system according to another embodiment of the present disclosure.

Figure 6:
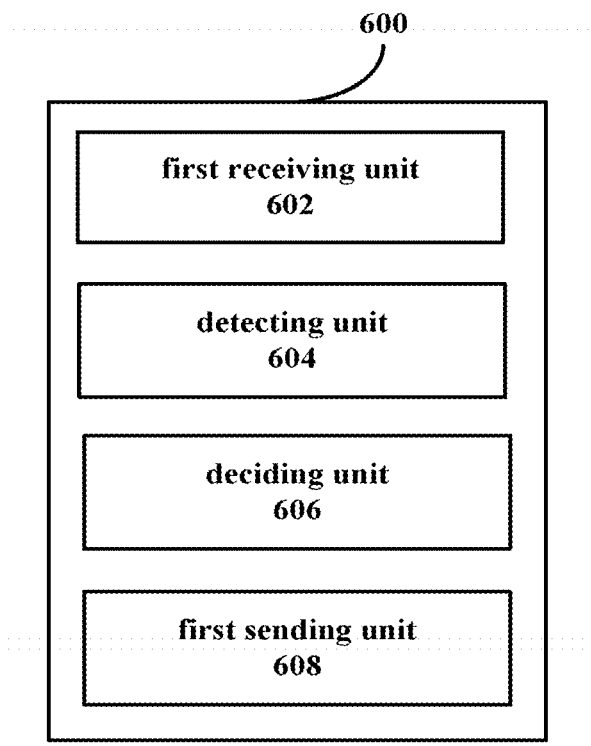
FIG. 6 is a block diagram illustrating yet another example of a functional configuration of an apparatus in a wireless communication system according to another embodiment of the present disclosure.

As shown in FIG. 6, an apparatus 600 in this example may include a first receiving unit 602, a detecting unit 604, a deciding unit 606 and a first sending unit 608. Here, the examples of the functional configurations of the first receiving unit 602, the detecting unit 604, and the first sending unit 608 are substantially the same as those of the corresponding units described above with reference to FIG. 4, and thus are not repeated here. Only an example of the functional configuration of the deciding unit 606 will be described in detail below.

It is to be understood that, in a case that the decision of switching is made on the small base station side, the first receiving unit 602 needs to further receive information indicating the reception signal strength, for example, RSRP, RSRQ and the like, from the user equipment served by the first base station (e.g., a macro base station), so that the deciding unit makes a decision of switching by comprehensively considering the information of the whole network.

The deciding unit 606 may be configured to make the switching instruction based on the information received by the first receiving unit, including the RSRP and/or RSRQ fed back by the MUE and the FUE. An example of an optimization algorithm for making the decision of switching may be referred to the foregoing description and will not be repeated here.

After the deciding unit 606 makes the switching instruction, the first sending unit 608 may send the switching instruction to the corresponding user equipment to instruct it to switch to operate on the unlicensed band.

Figure 7:
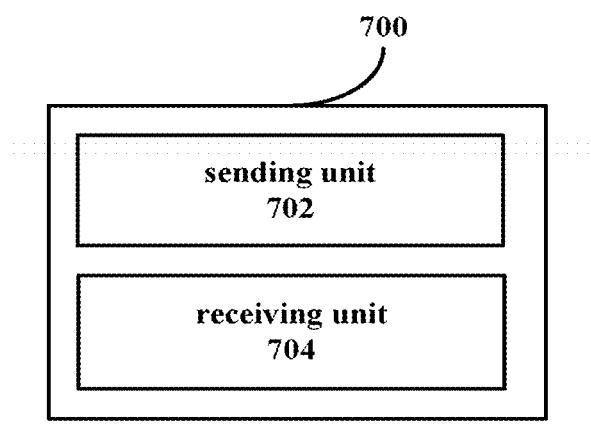
FIG. 7 is a block diagram illustrating an example of a functional configuration of an apparatus in a wireless communication system according to yet another embodiment of the present disclosure.

FIG. 7 is a block diagram illustrating an example of a functional configuration of an apparatus in a wireless communication system according to yet another embodiment of the present disclosure. The apparatus may be located on the user equipment side, particularly the FUE side for example.

As shown in FIG. 7, an apparatus 700 according to the embodiment may include a sending unit 702 and a receiving unit 704. An example of the functional configuration of each unit will be described in detail below.

The sending unit 702 may be configured to send to the second base station information indicating the reception signal strength measured by the user equipment served by the second base station. In particular, the sending unit 702 may send the measured RSRQ and/or RSRP to a small base station, and then the small base station forwards the same to a macro base station or makes a decision related to switching.

The receiving unit 704 may be configured to receive a switching instruction from the second base station, and the switching instruction may include an instruction that which of the user equipment is to switch to operate on the unlicensed band when the unlicensed band is idle and may further include operating time on the unlicensed band, so as to optimize the spectral efficiency and energy efficiency in the wireless communication system. Further, preferably, when the small base station detects that the unlicensed band is busy, the small base station may further notify corresponding user equipment to switch to operate on the licensed band. In this case, the switching instruction received from the small base station may further include the instruction to switch to operate on the licensed band for the user equipment.

In particular, as described above, the switching instruction may be made by the macro base station or may also be made by the small base station. Moreover, the small base station will notify the corresponding user equipment of the switching instruction so that the user equipment can switch to operate on the unlicensed band.

It should be understood that, although the examples of functional configurations of the apparatuses on the macro base station side, the small base station side and the user equipment side in the wireless communication system are described above with reference to FIGS. 1 to 7, these are only examples rather than limitations, and those skilled in the art can modify the above examples of the functional configurations in accordance with principles of the present disclosure. For example, combinations, additions, deletions or the like may be performed for the function modules in each of the embodiments, and such modifications all fall within the scope of the present disclosure.

Figure 8:
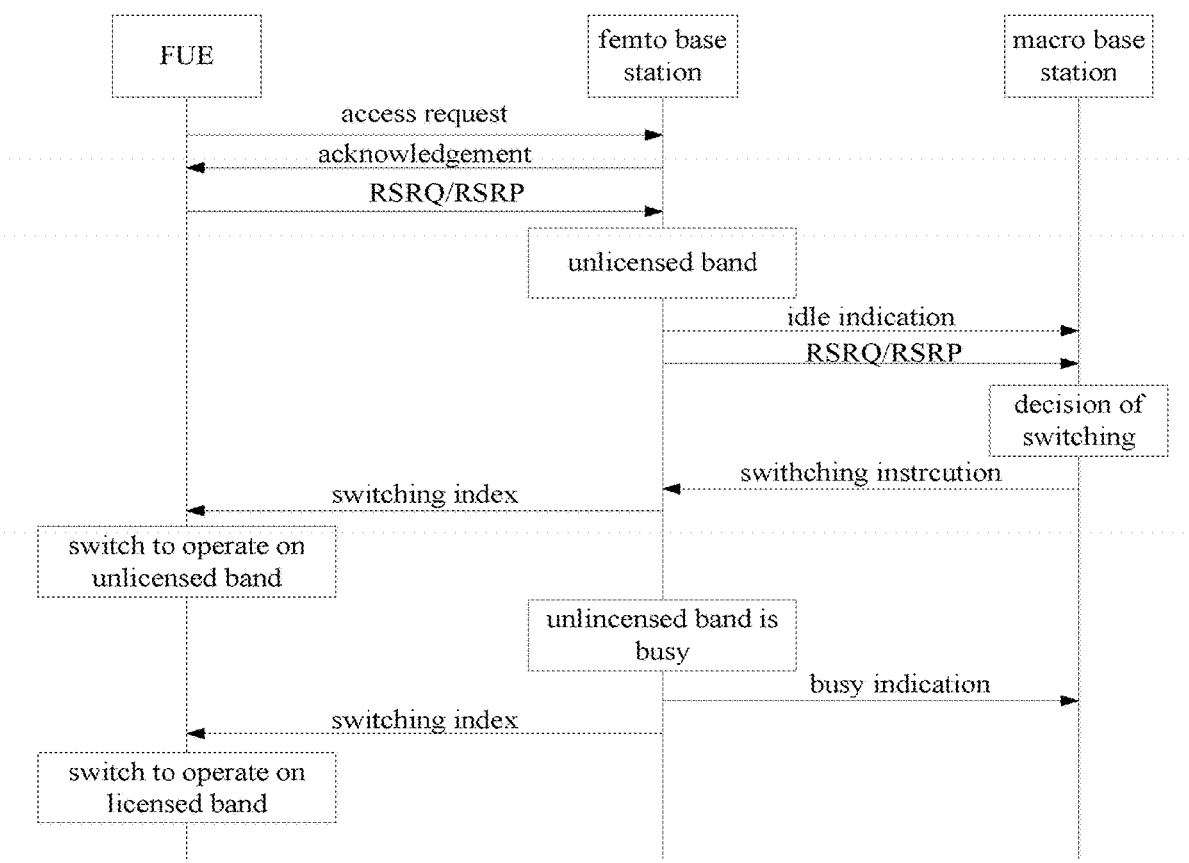
FIG. 8 is a schematic diagram illustrating an example of a signaling interaction flow in a wireless communication system according to an embodiment of the present disclosure.

Next, with reference to the examples of functional configurations of the apparatuses on the macro base station side, the small base station side, and the user equipment side in the wireless communication system as described above, a signaling interaction flow of switching operating band of the user equipment in a wireless communication system will be described. FIG. 8 is a schematic diagram illustrating an example of a signaling interaction flow in a wireless communication system according to an embodiment of the present disclosure.

In the example shown in FIG. 8, FUE represents the user equipment served by the second base station, the femto base station represents the second base station, and the macro base station represents the first base station, but the present disclosure is not limited thereto and is also applicable to other heterogeneous network. Next, a specific process example of switching the operating band of the FUE will be described with reference to FIG. 8.

As shown in FIG. 8, the FUE selects a serving cell (here, for example, a femtocell) based on the strongest reception signal and sends an access request, and the femtocell sends an acknowledgement message to the FUE in a case that there are resources available for the FUE to access. The FUE periodically feeds back RSRQ and/or RSRP to the femto base station after accessing to the femtocell.

Next, the femto base station sends an idle indication to the macro base station via, for example, an IP port of the Internet when the unlicensed band is detected as idle, and also sends the received RSRQ and/or RSRP to the macro base station. The macro station makes the decision of switching based on the received information and using a corresponding optimization algorithm, to determine which FUEs need to switch to operate on the unlicensed band so as to maximize the energy efficiency per unit bandwidth. After making the decision of switching, the macro base station may send the switching instruction to the femto base station via, for example, an X2 interface. The switching instruction may include which of the user equipment is to switch to operate on the unlicensed band and the corresponding operating time.

Then, the femto base station sends a switching index to the FUE by, for example, Radio Resource Control (RRC) signaling upon reception of the switching instruction, and the corresponding FUE can switch to operate on the corresponding unlicensed band based on the switching index. When the femto base station detects that the unlicensed band is busy subsequently, the femto base station may send a busy indication to the macro base station to inform the change of its operating band and also send the switching index to the FUE to notify the FUE to switch to operate on the licensed band. After that, FUE operates on the licensed band.

It is to be understood that the signaling interaction process shown in FIG. 8 is merely an example and those skilled in the art may modify the above-described process in accordance with the principles of the present disclosure. For example, in the signaling interaction process shown in FIG. 8, the switching instruction is made by the macro base station, but it may also be made by the femto base station, and in this case, the macro base station needs to forward the RSRP and/or RSRQ fed back by the MUE to the femto base station. As another example, in the signaling interaction process shown in FIG. 8, the decision of switching is made when the femto base station detects that the unlicensed band is idle. However, the decision of switching may also be made before the unlicensed band is detected as idle, and the femto base station is notified of the switching instruction upon reception of the idle indication.

Corresponding to the apparatus embodiment described above, a method in a wireless communication system is further disclosed in the embodiments of the present disclosure. Hereinafter, a process example of a method in a wireless communication system according to an embodiment of the present disclosure will be described with reference to FIGS. 9 to 11.

Figure 9:
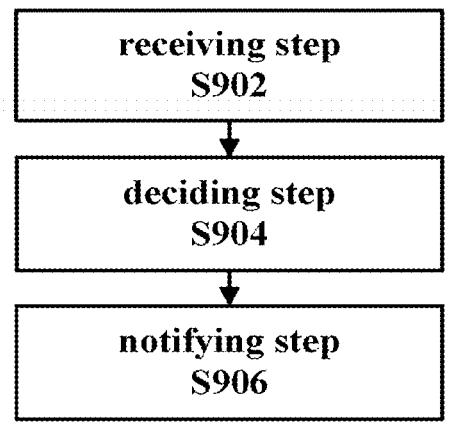
FIG. 9 is a flowchart illustrating an example of a method in a wireless communication system according to an embodiment of the present disclosure.

FIG. 9 is a flowchart illustrating a process example of a method in a wireless communication system according to an embodiment of the present disclosure. The method corresponds to the above-described apparatus on the macro base station side.

As shown in FIG. 9, the method according to the embodiment may include a receiving step S902, a deciding step S904, and a notifying step S906.

The method starts at the receiving step S902 in which the information indicating the reception signal strength from the user equipment served by the second base station and the information indicating the reception signal strength from the user equipment served by the first base station may be received. The information indicating the reception signal strength may include at least one of RSRQ and RSRP.

Next, in the deciding step S904, a switching instruction may be made based on the received information to optimize the energy efficiency and spectral efficiency in the wireless communication system. The switching instruction may include an instruction that which of the user equipment is to switch to operate on an unlicensed band, and may also include operating time on the unlicensed band. The specific implementation for making the decision of switching to optimize energy efficiency and spectral efficiency may be referred to the foregoing description in the corresponding apparatus embodiment above, and will not be repeated here.

Then, in the notifying step S906, the second base station may be notified of the switching instruction, so that the second base station may notify the corresponding user equipment to switch to operate on the unlicensed band based on the switching instruction.

Figure 10:
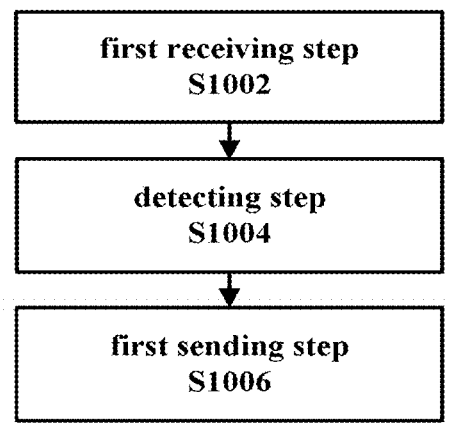
FIG. 10 is a flowchart illustrating an example of a method in a wireless communication system according to another embodiment of the present disclosure.

FIG. 10 is a flowchart illustrating a process example of a method in a wireless communication system according to another embodiment of the present disclosure. The method corresponds to the above-described apparatus on the small base station side.

As shown in FIG. 10, the method according to this embodiment may include a first receiving step S1002, a detecting step S1004, and a first sending step S1006.

The method starts at the first receiving step S1002 in which the information indicating the reception signal strength from the user equipment served by the second base station service is received. The information may be, for example, RSRQ and/or RSRP.

Next, in the detecting step S1004, it is detected whether the unlicensed band is idle.

Then, in the first sending step S1006, when the unlicensed band is detected as idle, the switching instruction made based on the received information is sent to the corresponding user equipment to optimize the energy efficiency and the spectral efficiency in the wireless communication system. The switching instruction may include an instruction that which of the user equipment is to switch to operate on the unlicensed band, and may also include corresponding operating time.

The switching instruction may be made on the macro base station side or may be made on the small base station side. In a case that the switching instruction is made on the small base station side, the RSRQ and/or RSRP fed back from the user equipment served by the macro base station is further received.

Figure 11:
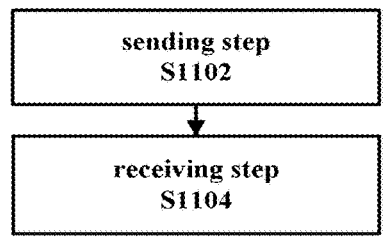
FIG. 11 is a flowchart illustrating an example of a method in a wireless communication system according to yet another embodiment of the present disclosure.

FIG. 11 is a flowchart illustrating a process example of a method in a wireless communication system according to yet another embodiment of the present disclosure. The method corresponds to the above-described apparatus on the user equipment side.

As shown in FIG. 11, the method according to the embodiment may include a sending step S1102 and a receiving step S1104.

The method starts at the sending step S1102 in which the information indicating the reception signal strength measured by the user equipment served by the second base station is sent to the second base station. The information may include at least one of the RSRQ and the RSRP for the macro base station or the small base station to make the decision of switching.

Next, in the receiving step S1104, a switching instruction is received from the second base station, the switching instruction including an instruction that which of the user equipment is to switch to operate on an unlicensed band when the unlicensed band is idle, to optimize the energy efficiency and the spectral efficiency in the wireless communication system.

It should be noted that, although the process examples of the methods in the wireless communication system according to the embodiments of the present disclosure are described as above, these are only examples rather than limitations. Those skilled in the art can modify the above embodiments in accordance with principles of the present disclosure. For example, steps in each of the embodiments can be added, deleted, or combined, and such modifications all fall within the scope of the present disclosure.

In addition, it should be noted that, the method embodiments here correspond to the above-described apparatus embodiments, thus contents which are not described in detail in the method embodiments may be referred to the corresponding description in the apparatus embodiments, and will not be repeated here.

In addition, an electronic device is further provided according to an embodiment of the present disclosure, which may include one or more processors configured to perform the above-described methods in the wireless communication system according to the embodiments of the present disclosure.

It is to be understood that the machine-executable instructions in a storage medium and a program product according to an embodiment of the present disclosure may be configured to perform a method corresponding to the above apparatus embodiment, and thus the contents which are not described in detail herein may be referred to the foregoing description at corresponding positions and are not repeated herein.

Accordingly, a storage medium on which the above program product storing machine-executable instructions is carried is also included in the present disclosure. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1200 illustrated in FIG. 12, which can perform various functions when various programs are installed thereon.

Figure 12:
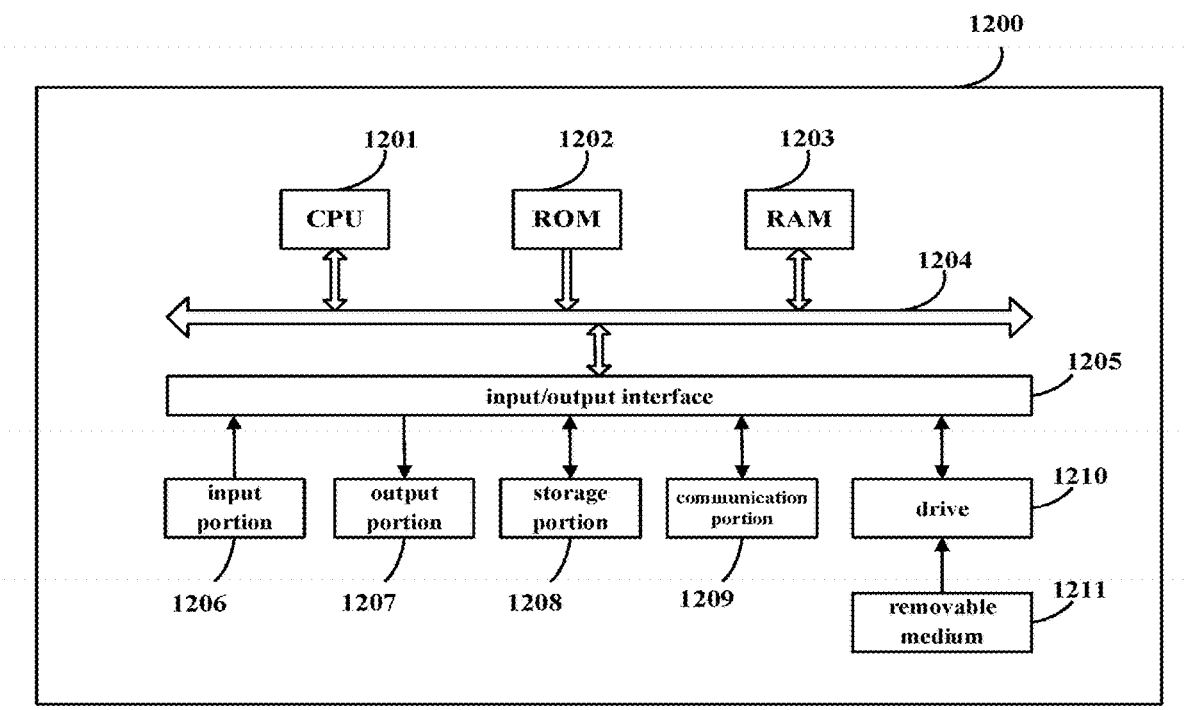
FIG. 12 is a block diagram illustrating an exemplary structure of a personal computer as an information processing device according to an embodiment of the present disclosure.

In FIG. 12, a Central Processing Unit (CPU) 1201 performs various processes according to a program stored in a Read Only Memory (ROM) 1202 or loaded from a storage portion 1208 into a Random Access Memory (RAM) 1203 in which data required when the CPU 1201 performs the various processes is also stored as needed.

The CPU 1201, the ROM 1202 and the RANI 1203 are connected to each other via a bus 1204 to which an input/output interface 1205 is also connected.

The following components are connected to the input/output interface 1205: an input portion 1206 including a keyboard, a mouse, etc.; an output portion 1207 including a display, e.g., a Cathode Ray Tube (CRT), a Liquid Crystal Display (LCD), etc., a speaker, etc.; a storage portion 1208 including a hard disk, etc.; and a communication portion 1209 including a network interface card, e.g., an LAN card, a modem, etc. The communication portion 1209 performs a communication process over a network, e.g., the Internet.

A drive 1210 is also connected to the input/output interface 1205 as needed. A removable medium 1211, e.g., a magnetic disk, an optical disk, an magneto optical disk, a semiconductor memory, etc., can be installed on the drive 1210 as needed so that a computer program fetched therefrom can be installed into the storage portion 1208 as needed.

In the case that the foregoing series of processes are performed in software, a program constituting the software is installed from a network, e.g., the Internet, etc., or a storage medium, e.g., the removable medium 1211, etc.

Those skilled in the art shall appreciate that such a storage medium will not be limited to the removable medium 1211 illustrated in FIG. 12 in which the program is stored and which is distributed separately from the apparatus to provide a user with the program. Examples of the removable medium 1211 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1202, a hard disk included in the storage portion 1208, etc., in which the program is stored and which is distributed together with the apparatus including the same to the user.

Figure 13:
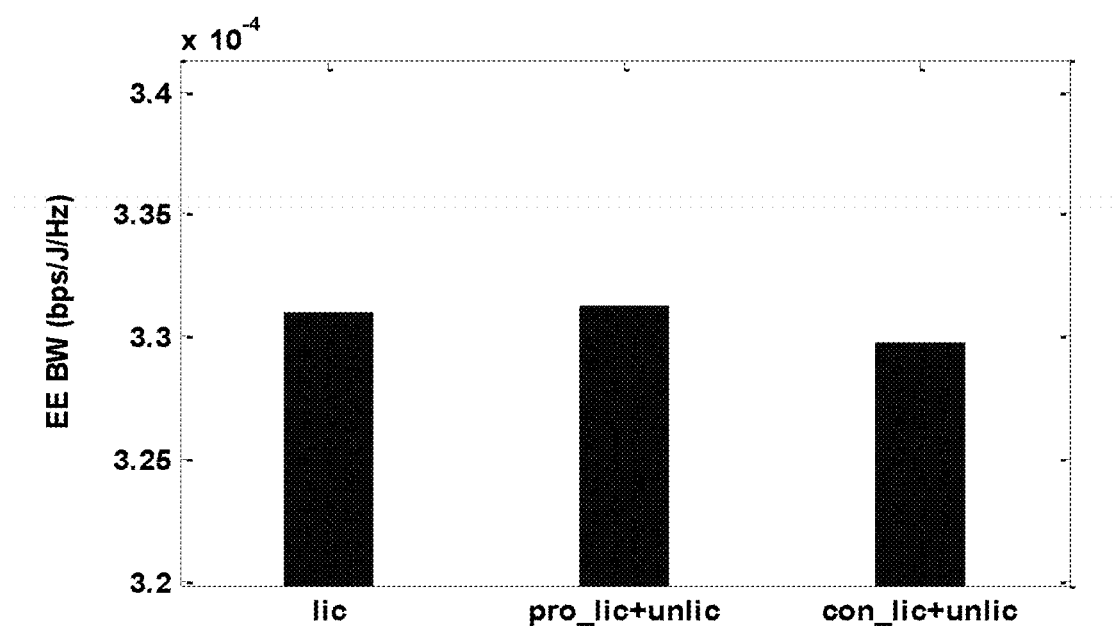
FIG. 13 is a schematic diagram illustrating an example of comparison between simulation results of system performances of the technology of the present disclosure and the conventional technology.

Next, an example of comparison between simulation results of system performances of the disclosed technology and the conventional technology will be described with reference to FIG. 13. FIG. 13 is a schematic diagram illustrating an example of comparison between simulation results of system performances of the disclosed technology and the conventional technology.

The simulation parameters are shown in Table 1 below.

TABLE 1

Simulation parameter

| Parameter | Value |
|---|---|
| Bandwidth (MHz) | 20 |
| Carrier frequency (GHz) Licensed band | 3.5 |
| Carrier frequency (GHz) Unlicensed band | 5 |
| Maximum transmission power of a macrocell (dBm) | 46 |
| Maximum transmission power of a femtocell (dBm) | 23 |
| Radius of a macrocell (m) | 500/3 |
| Radius of a femtocell (m) | 10 |
| Antenna gain of a macrocell (dBi) | 14 |
| Antenna gain of a femtocell (dBi) | 5 |
| Minimum distance between a macro base station and a user equipment (m) | 35 |
| Minimum distance between a femto base station and a user equipment (m) | 1 |
| Maximum iteration time $z_{max}$ | 100 |
| Highest reception power $H_{RX}$ | −30 dBm |
| Lowest reception power $L_{RX}$ | −140 dBm |
| Noise power | −174 dBm |

In the simulation process, an urban deployment scenario is considered, and three schemes in which the femtocell operates on the licensed band and the unlicensed band are compared by the simulation.

In Scheme 1 (a traditional femtocell operation scheme, abbreviated as lic), the femtocell operates only on the licensed band by using only an LTE interface, and this scheme is the dominant operation mode of the femtocell currently used in LTE.

In Scheme 2 (a scheme according to the present disclosure, abbreviated as pro_lic+unlic), the femtocell may operate on the licensed and unlicensed bands by using different air interfaces. When the femtocell detects that the unlicensed band is idle, an optimization decision is made by, for example, a macrocell, to determine which of the user equipment needs to switch to operate on the unlicensed band so as to maximize the energy efficiency per unit bandwidth (abbreviated as EE_BW) in the network.

In Scheme 3 (a comparison scheme, abbreviated as con lic+unlic), the femtocell and the macrocell operate on different bands. The macrocell operates on the licensed band and the femtocell operates only on the unlicensed band.

In order to comprehensively consider the energy efficiency and spectral efficiency, the newly introduced parameter EE_BW (energy efficiency per unit bandwidth in the network) is concerned. The simulation results are shown in FIG. 13. Since only one femtocell is considered in the simulation, EE_BW is tested by averaging multiple results. As can be seen from the simulation results, the performance of Scheme 2 is better than that of Scheme 1 and Scheme 3. In Scheme 2, when the FUE switches to the unlicensed band, the bandwidth occupied originally by the FUE on the licensed band will not be allocated to other FUEs on the licensed band, and thus resources on this part of the licensed band will be idle. Accordingly, MUEs occupying the same resources as the FUE having switched to the unlicensed band may suffer from less interference, and the performance of the MUEs will be improved. Further, the FUE having switched to the unlicensed band no longer suffers from interference from the macro cell, and thus can have improved performance. Further, after the FUE switches to the unlicensed band, only a portion of the unlicensed band rather than the whole unlicensed band is occupied, so the remaining spectrum can also be used for other purposes. It can be seen that the performance of Scheme 2 proposed in the present disclosure may be better than that of Scheme 1 and Scheme 3.

In summary, it can be seen that, compared with the conventional technology, by applying the technology of the present disclosure, optimization of both spectral efficiency and energy efficiency can be achieved, thereby improving the system performance.

Next, an application example according to the present disclosure will be described with reference to FIGS. 14 to 16.

[Application Example Regarding eNB]
(First Application Example)

Figure 14:
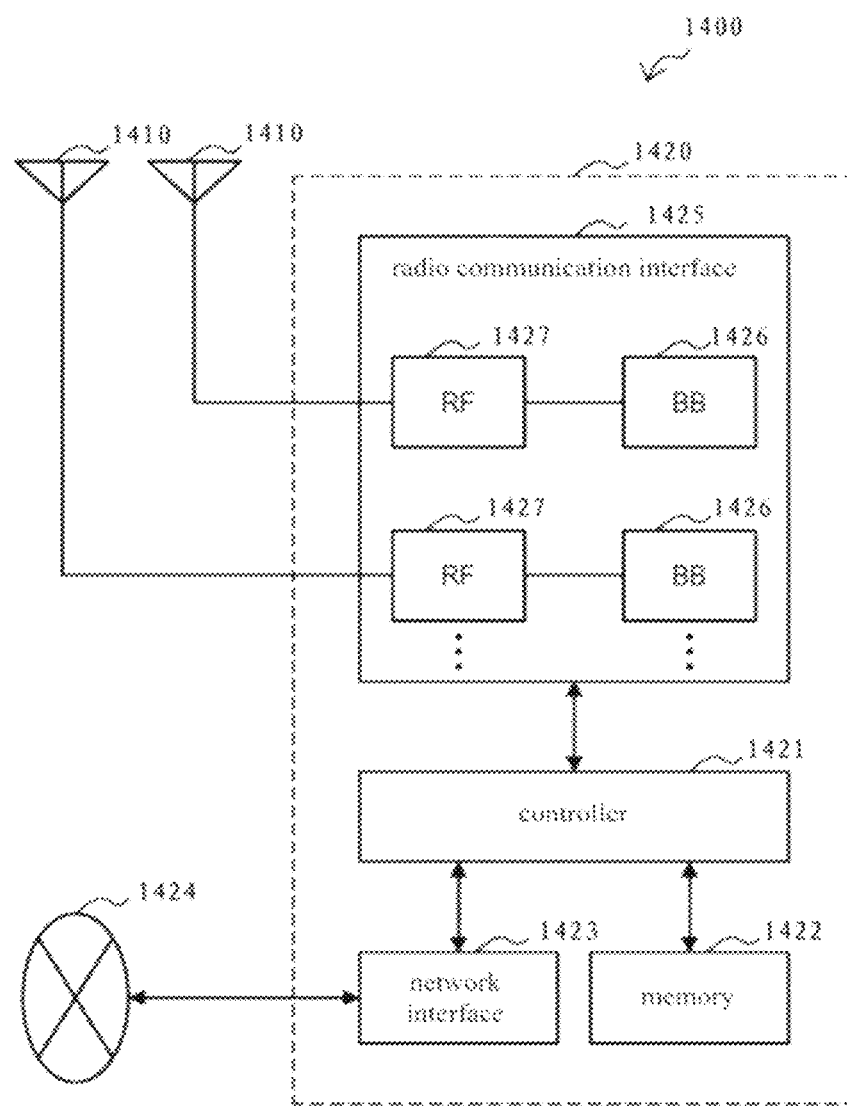
FIG. 14 is a block diagram illustrating a first example of a schematic configuration of an evolved Node B (eNB) to which the technology of the present disclosure may be applied.

FIG. 14 is a block diagram illustrating a first example of a schematic configuration of an eNB to which the technology of the present disclosure may be applied. An eNB 1400 includes one or more antennas 1410 and a base station apparatus 1420. Each antenna 1410 and the base station apparatus 1420 may be connected to each other via an RF cable.

Each of the antennas 1410 includes a single or multiple antenna elements (such as multiple antenna elements included in an MIMO antenna), and is used for the base station apparatus 1420 to transmit and receive radio signals. The eNB 1400 may include the multiple antennas 1410, as illustrated in FIG. 14. For example, the multiple antennas 1410 may be compatible with multiple bands used by the eNB 1400. Although FIG. 14 illustrates the example in which the eNB 1400 includes the multiple antennas 1410, the eNB 1400 may also include a single antenna 1410.

The base station apparatus 1420 includes a controller 1421, a memory 1422, a network interface 1423, and a radio communication interface 1425.

The controller 1421 may be, for example, a CPU or a DSP, and operates various functions of a higher layer of the base station apparatus 1420. For example, the controller 1421 generates a data packet from data in signals processed by the radio communication interface 1425, and transfers the generated packet via the network interface 1423. The controller 1421 may bundle data from multiple base band processors to generate the bundled packet, and transfer the generated bundled packet. The controller 1421 may have logical functions of performing control such as radio resource control, radio bearer control, mobility management, admission control, and scheduling. The control may be performed in cooperation with an eNB or a core network node in the vicinity. The memory 1422 includes RAM and ROM, and stores a program that is executed by the controller 1421, and various types of control data (such as a terminal list, transmission power data, and scheduling data).

The network interface 1423 is a communication interface for connecting the base station apparatus 1420 to a core network 1424. The controller 1421 may communicate with a core network node or another eNB via the network interface 1423. In that case, the eNB 1400, and the core network node or the other eNB may be connected to each other through a logical interface (such as an S1 interface and an X2 interface). The network interface 1423 may also be a wired communication interface or a radio communication interface for radio backhaul. If the network interface 1423 is a radio communication interface, the network interface 1423 may use a higher frequency band for radio communication than a frequency band used by the radio communication interface 1425.

The radio communication interface 1425 supports any cellular communication scheme such as Long Term Evolution (LTE) and LTE-Advanced, and provides radio connection to a terminal positioned in a cell of the eNB 1400 via the antenna 1410. The radio communication interface 1425 may typically include, for example, a baseband (BB) processor 1426 and an RF circuit 1427. The BB processor 1426 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1426 may have a part or all of the above-described logical functions instead of the controller 1421. The BB processor 1426 may be a memory that stores a communication control program, or a module that includes a processor and a related circuit configured to execute the program. Updating the program may allow the functions of the BB processor 1426 to be changed. The module may be a card or a blade that is inserted into a slot of the base station apparatus 1420. Alternatively, the module may also be a chip that is mounted on the card or the blade. Meanwhile, the RF circuit 1427 may include, for example, a mixer, a filter, and an amplifier, and transmits and receives radio signals via the antenna 1410.

The radio communication interface 1425 may include the multiple BB processors 1426, as illustrated in FIG. 14. For example, the multiple BB processors 1426 may be compatible with multiple frequency bands used by the eNB 1400. The radio communication interface 1425 may include the multiple RF circuits 1427, as illustrated in FIG. 14. For example, the multiple RF circuits 1427 may be compatible with multiple antenna elements. Although FIG. 14 illustrates the example in which the radio communication interface 1425 includes the multiple BB processors 1426 and the multiple RF circuits 1427, the radio communication interface 1425 may also include a single BB processor 1426 or a single RF circuit 1427.

(Second Application Example)

Figure 15:
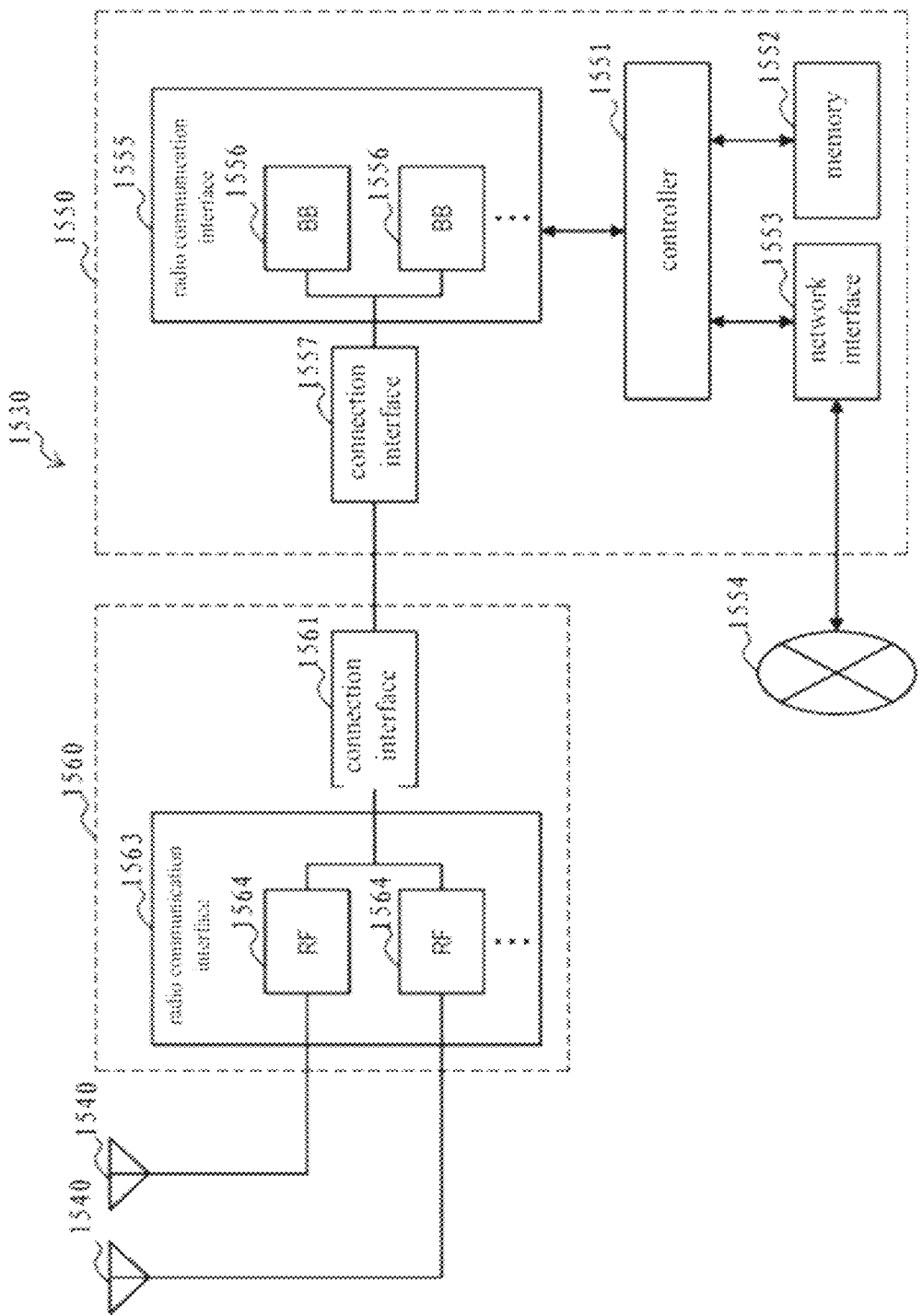
FIG. 15 is a block diagram illustrating a second example of a schematic configuration of an eNB to which the technology of the present disclosure may be applied.

FIG. 15 is a block diagram illustrating a second example of a schematic configuration of an eNB to which the technology of the present disclosure may be applied. An eNB 1530 includes one or more antennas 1540, a base station apparatus 1550, and an RRH 1560. Each antenna 1540 and the RRH 1560 may be connected to each other via an RF cable. The base station apparatus 1550 and the RRH 1560 may be connected to each other via a high speed line such as an optical fiber cable.

Each of the antennas 1540 includes a single or multiple antenna elements (such as multiple antenna elements included in an MIMO antenna), and is used for the RRH 1560 to transmit and receive radio signals. The eNB 1530 may include the multiple antennas 1540, as illustrated in FIG. 15. For example, the multiple antennas 1540 may be compatible with multiple frequency bands used by the eNB 1530. Although FIG. 15 illustrates the example in which the eNB 1530 includes the multiple antennas 1540, the eNB 1530 may also include a single antenna 1540.

The base station apparatus 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 14.

The radio communication interface 1555 supports any cellular communication scheme such as LTE and LTE-Advanced, and provides radio communication to a terminal positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 14, except the BB processor 1556 is connected to the RF circuit 1564 of the RRH 1560 via the connection interface 1557. The radio communication interface 1555 may include the multiple BB processors 1556, as illustrated in FIG. 15. For example, the multiple BB processors 1556 may be compatible with multiple frequency bands used by the eNB 1530. Although FIG. 15 illustrates the example in which the radio communication interface 1555 includes the multiple BB processors 1556, the radio communication interface 1555 may also include a single BB processor 1556.

The connection interface 1557 is an interface for connecting the base station apparatus 1550 (radio communication interface 1555) to the RRH 1560. The connection interface 1557 may also be a communication module for communication in the above-described high speed line that connects the base station apparatus 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station apparatus 1550. The connection interface 1561 may also be a communication module for communication in the above-described high speed line.

The radio communication interface 1563 transmits and receives radio signals via the antenna 1540. The radio communication interface 1563 may typically include, for example, the RF circuit 1564. The RF circuit 1564 may include, for example, a mixer, a filter, and an amplifier, and transmits and receives radio signals via the antenna 1540. The radio communication interface 1563 may include multiple RF circuits 1564, as illustrated in FIG. 15. For example, the multiple RF circuits 1564 may support multiple antenna elements. Although FIG. 15 illustrates the example in which the radio communication interface 1563 includes the multiple RF circuits 1564, the radio communication interface 1563 may also include a single RF circuit 1564.

In the eNB 1400 and the eNB 1530 illustrated in FIGS. 14 and 15, the sending unit and the receiving unit described with reference to FIGS. 1, 4 to 6 may be implemented by the radio communication interface 1425, and the radio communication interface 1555 and/or the radio communication interface 1563. At least a part of the functions of the apparatus on the base station side may also be implemented by the controller 1421 and the controller 1551.

[Application Example Regarding User Equipment]

Figure 16:
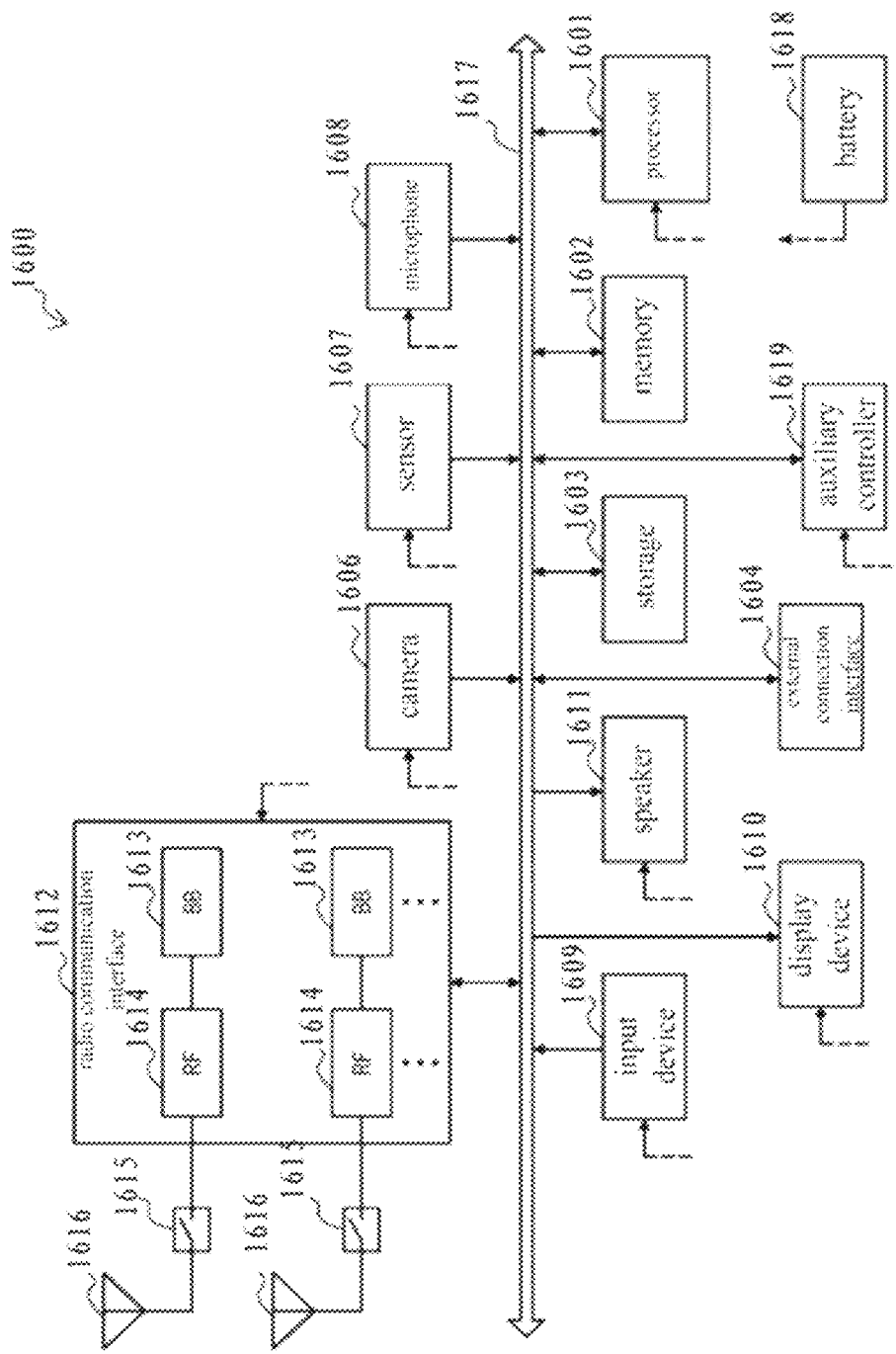
FIG. 16 is a block diagram illustrating an example of a schematic configuration of a smartphone to which the technology of the present disclosure may be applied.

FIG. 16 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, a camera 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619.

The processor 1601 may be, for example, a CPU or a system on a chip (SoC), and controls functions of an application layer and another layer of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. The sensor 1607 may include a group of sensors such as a measurement sensor, a gyro sensor, a geomagnetic sensor, and an acceleration sensor. The microphone 1608 converts sounds that are input to the smartphone 1600 to audio signals. The input device 1609 includes, for example, a touch sensor configured to detect touch onto a screen of the display device 1610, a keypad, a keyboard, a button, or a switch, and receives an operation or an information input from a user. The display device 1610 includes a screen such as a liquid crystal display (LCD) and an organic light-emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 may typically include, for example, a BB processor 1613 and an RF circuit 1614. The BB processor 1613 may perform, for example, encoding/decoding, modulating/demodulating, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module having the BB processor 1613 and the RF circuit 1614 integrated thereon. The radio communication interface 1612 may include the multiple BB processors 1613 and the multiple RF circuits 1614, as illustrated in FIG. 16. Although FIG. 16 illustrates the example in which the radio communication interface 1612 includes the multiple BB processors 1613 and the multiple RF circuits 1614, the radio communication interface 1612 may also include a single BB processor 1613 or a single RF circuit 1614.

Furthermore, in addition to a cellular communication scheme, the radio communication interface 1612 may support another type of radio communication scheme such as a short-distance wireless communication scheme, a near field communication scheme, and a radio local area network (LAN) scheme. In that case, the radio communication interface 1612 may include the BB processor 1613 and the RF circuit 1614 for each radio communication scheme.

Each of the antenna switches 1615 switches connection destinations of the antennas 1616 among multiple circuits (such as circuits for different radio communication schemes) included in the radio communication interface 1612.

Each of the antennas 1616 includes a single or multiple antenna elements (such as multiple antenna elements included in an MIMO antenna), and is used for the radio communication interface 1612 to transmit and receive radio signals. The smartphone 1600 may include the multiple antennas 1616, as illustrated in FIG. 16. Although FIG. 16 illustrates the example in which the smartphone 1600 includes the multiple antennas 1616, the smartphone 1600 may also include a single antenna 1616.

Furthermore, the smartphone 1600 may include the antenna 1616 for each radio communication scheme. In that case, the antenna switches 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary controller 1619 to each other. The battery 1618 supplies power to blocks of the smartphone 1600 illustrated in FIG. 16 via feeder lines, which are partially shown as dashed lines in the figure. The auxiliary controller 1619 operates a minimum necessary function of the smartphone 1600, for example, in a sleep mode.

In the smartphone 1600 illustrated in FIG. 16, the sending unit and the receiving unit described by using FIG. 7 may be implemented by the radio communication interface 1612. At least a part of the functions of the apparatus on the user equipment side may also be implemented by the processor 1601 or the auxiliary controller 1619.

Preferred embodiments of the present disclosure are described with reference to the drawings above, but the present disclosure is of course not limited to the above examples. Those skilled in the art may make various changes and modifications within the scope of the appended claims, and it should be understood that these changes and modifications naturally fall within the technical scope of the present disclosure.

For example, in the above embodiments, multiple functions included in one unit may be implemented by separated devices. Alternatively, in the above embodiments, multiple functions implemented by multiple units may be implemented by separated devices. In addition, one of the above functions may be implemented by multiple units. As a matter of course, such configuration is included in the technical scope of the present disclosure.

In the description, steps described in the flowcharts not only include processing performed chronically in the order described, but also include processing performed concurrently or separately but not necessarily chronically. In addition, even if in steps performed chronically, as a matter of course, the order may be changed appropriately.

The invention claimed is:

1. An apparatus in a wireless communication system, wherein the wireless communication system comprises a first base station and a second base station, the first base station and the second base station sharing a licensed band and the second base station being operable on an unlicensed band, the apparatus comprising:
processing circuitry configured to:
receive information indicating a reception signal strength from a first plurality of user equipment served by the second base station and information indicating a reception signal strength from a second user equipment served by the first base station;
detect whether the unlicensed band is idle;
determine at least one target user equipment from the first plurality of user equipment to switch to operate on the unlicensed band from the licensed band based on the received information, when the unlicensed band is idle, the at least one target user equipment being determined so that a total energy efficiency of the first base station and the second base station is maximized while each data rate of all of the first plurality of user equipment and the second user equipment is greater than a predetermined threshold, in case that the at least one target user equipment is switched to the unlicensed band from the licensed band;

make a switching instruction for the at least one target user equipment, to switch to operate on the unlicensed band, based on the determination; and notify the second base station of the switching instruction to transmit the switching instruction to the at least one target user equipment.

2. The apparatus according to claim 1, wherein the processing circuitry is further configured to determine energy efficiency per unit bandwidth in the wireless communication system for determining the total energy efficiency of the first base station and the second base station, and make the switching instruction based on the energy efficiency per unit bandwidth to optimize the energy efficiency per unit bandwidth.

3. The apparatus according to claim 2, wherein the processing circuitry is further configured to make the switching instruction such that the energy efficiency per unit bandwidth is maximized while satisfying predetermined performance requirements of all of the first plurality user equipment and the second user equipment, by keeping bandwidth of the licensed band which was used by the at least one target user equipment as idle, so that the second user equipment occupying the corresponding licensed band suffers less interference than before switching the at least one target user equipment to the unlicensed band.

4. The apparatus according to claim 3, wherein the processing circuitry is further configured to;
determine a signal-to-interference-plus-noise ratio of each of the first plurality of user equipment and the second user equipment,
determine an optimum signal-to-interference-plus-noise ratio threshold as an optimization variable to maximize the energy efficiency per unit bandwidth, based on a ranking number of the signal-to-interference-plus-noise ratio of the first plurality of user equipment,
determine the at least one target user equipment having the signal-to-interference-plus-noise ratio less than the optimum signal-to-interference-plus-noise ratio.

5. The apparatus according to claim 1, wherein the processing circuitry is further configured to receive an idle indication of whether the unlicensed band is idle from the second base station.

6. The apparatus according to claim 5, wherein the processing circuitry is further configured to make the switching instruction upon reception of the idle indication that the unlicensed band is idle.

7. The apparatus according to claim 5, wherein the processing circuitry is further configured to notify the second base station of the switching instruction upon reception of the idle indication that the unlicensed band is idle.

8. The apparatus according to claim 1, wherein the information indicating the reception signal strength comprises at least one of reference signal receiving quality and reference signal receiving power.

9. The apparatus according to claim 1, wherein the switching instruction further comprises an operating time during which the at least one target user equipment being to switch to operate on the unlicensed band operates on the unlicensed band.

10. The apparatus according to claim 1, wherein the first base station is a macro base station, and the second base station is a small base station.

11. An apparatus in a wireless communication system, wherein the wireless communication system comprises a first base station and a second base station, the first base station and the second base station sharing a licensed band and the second base station being operable on an unlicensed band, the apparatus comprising:
processing circuitry configured to:
receive information indicating a reception signal strength from a first plurality of user equipment served by the second base station;
detect whether the unlicensed band is idle; and
send, in a case that it is detected the unlicensed band is idle, a switching instruction to at least one target user equipment from the first plurality of user equipment to switch to operate on the unlicensed band from the licensed band based on the received information, the at least one target user equipment being determined so that a total energy efficiency of the first base station and the second base station is maximized while each data rate of all of the first plurality of user equipment and a second user equipment served by the first base station is greater than a predetermined threshold, in case that the at least one target user equipment is switched to the unlicensed band from the licensed band,
wherein the switching instruction comprises an instruction to switch the at least one target user equipment to operate on the unlicensed band, based on the determination.

12. The apparatus according to claim 11, wherein the switching instruction is made by determining a signal-to-interference-plus-noise ratio of each of the first plurality of user equipment and the second user equipment, determine an optimum signal-to-interference-plus-noise ratio threshold as an optimization variable to maximize energy efficiency per unit bandwidth, based on a ranking number of the signal-to-interference-plus-noise ratio of the first plurality of user equipment, and determining the at least one target user equipment having the signal-to-interference-plus-noise ratio less than the optimum signal-to-interference-plus-noise ratio.

13. The apparatus according to claim 11, wherein the processing circuitry is further configured to send, in a case that it is detected the unlicensed band is busy, to the at least one target user equipment an instruction to switch to operate on the licensed band.

14. The apparatus according to claim 11, wherein the processing circuitry is further configured to receive information indicating a reception signal strength from the second user equipment served by the first base station, and to make the switching instruction based on the received information.

15. The apparatus according to claim 11, wherein the information indicating the reception signal strength comprises at least one of reference signal receiving quality and reference signal receiving power.

16. The apparatus according to claim 11, wherein the switching instruction further comprises an operating time during which the at least one target user equipment being to switch to operate on the unlicensed band operates on the unlicensed band.

17. An apparatus in a wireless communication system, wherein the wireless communication system comprises a first base station and a second base station, the first base station and the second base station sharing a licensed band and the second base station being operable on an unlicensed band, the apparatus comprising:
processing circuitry configured to:
send to the second base station information indicating a reception signal strength measured by each of a first plurality user equipment served by the second base station; and receive, at a target user equipment, a switching instruction from the second base station, the switching instruction indicating to switch to operate on the unlicensed band from the licensed band, when the unlicensed band is idle, the target user equipment being determined so that a total energy efficiency of the first base station and the second base station is maximized while each data rate of all of the first plurality of user equipment and a second user equipment served by the first base station is greater than a predetermined threshold, in case that the target user equipment is switched to the unlicensed band from the licensed band.

18. The apparatus according to claim 17, wherein the information indicating the reception signal strength comprises at least one of reference signal receiving quality and reference signal receiving power.

19. The apparatus according to claim 17, wherein the switching instruction further comprises an operating time during which the target user equipment being to switch to operate on the unlicensed band operates on the unlicensed band.

20. The apparatus according to claim 17, wherein the switching instruction further comprises an instruction that the target user equipment is to switch to operate on the licensed band in a case that the unlicensed band is busy.

\* \* \* \* \*